(12) United States Patent
Zhang et al.

(10) Patent No.: US 11,262,471 B2
(45) Date of Patent: Mar. 1, 2022

(54) ITERATIVE STOCHASTIC SEISMIC INVERSION

(71) Applicant: BP Corporation North America Inc., Houston, TX (US)

(72) Inventors: Jingfeng Zhang, Katy, TX (US); Matthew Walker, Hersham (GB)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 122 days.

(21) Appl. No.: 16/785,755

(22) Filed: Feb. 10, 2020

(65) Prior Publication Data

US 2020/0278468 A1 Sep. 3, 2020

Related U.S. Application Data

(60) Provisional application No. 62/812,633, filed on Mar. 1, 2019.

(51) Int. Cl.
*G01V 1/50* (2006.01)

(52) U.S. Cl.
CPC .......... *G01V 1/50* (2013.01); *G01V 2210/665* (2013.01)

(58) Field of Classification Search
CPC ............... G01V 1/50; G01V 2210/665; G01V 2210/6244; G01V 2210/624; G01V 2210/614; G01V 2210/6169; G01V 2210/6242; G01V 2210/61; G01V 2210/6222; G01V 1/306
See application file for complete search history.

(56) References Cited

U.S. PATENT DOCUMENTS

| 6,654,692 | B1 * | 11/2003 | Neff | G01V 1/306 |
| | | | | 702/11 |
| 7,254,091 | B1 * | 8/2007 | Gunning | G01V 11/00 |
| | | | | 367/73 |
| 9,836,449 | B2 * | 12/2017 | Tong | E21B 47/00 |
| 2003/0204312 | A1 * | 10/2003 | Woronow | G01V 1/364 |
| | | | | 702/14 |
| 2006/0136162 | A1 * | 6/2006 | Hamman | G01V 1/306 |
| | | | | 702/104 |
| 2013/0325350 | A1 | 12/2013 | Thorne | |

(Continued)

OTHER PUBLICATIONS

Dario Grana, et al, "Probabilistic Petrophysical-Properties Estimation Intergrating Statistical Rock Physics With Seismic Inversion"; Geophysics, Society of Exploration vol. 75, No. 3, May 1, 2010; pp. 21-37, Fig B.

(Continued)

*Primary Examiner* — Mischita L Henson
(74) *Attorney, Agent, or Firm* — Conley Rose, P.C.

(57) ABSTRACT

A method includes receiving a first transition probability matrix (TPM) of a subsurface region, wherein the TPM defines, for a given lithology at a current depth sample (or micro-layer), a probability of particular lithologies at a next depth sample (or micro-layer), receiving seismic data for the subsurface region, utilizing the first TPM and the seismic data to generate first pseudo wells, calculating a second TPM from the first pseudo wells, determining whether the second TPM is consistent with the first TPM, and utilizing the first pseudo wells to characterize a reservoir in the subsurface region when the second TPM is determined to be consistent with the first TPM.

20 Claims, 5 Drawing Sheets

(56) References Cited

U.S. PATENT DOCUMENTS

2016/0116619 A1* 4/2016 Leiceaga ............ G01V 1/345
  367/72
2018/0156932 A1  6/2018 Sain
2018/0217281 A1* 8/2018 Basler-Reeder ...... G01V 1/307
2018/0238148 A1* 8/2018 Canady ................ G06F 17/10

OTHER PUBLICATIONS

Lindberg, David V. et al., Inference of the Transition Matrix in Convolved Hidden Markov Models by a Generalized Baum-Welch Algorithm, pp. 1-39, 2015.

* cited by examiner

ITERATIVE STOCHASTIC SEISMIC INVERSION

CROSS-REFERENCE TO RELATED APPLICATIONS

This application claims priority to U.S. Provisional patent application No. 62/812,633, filed with the United States Patent and Trademark Office on Mar. 1, 2019 and entitled "Iterative Stochastic Seismic Inversion," the disclosure of which is incorporated herein by reference in its entirety.

BACKGROUND

The present disclosure relates generally to analyzing seismic data, and more specifically, to utilizing improved stochastic seismic inversion techniques in prediction of reservoir properties.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

In conjunction with the creation of an image or profile of a subsurface region, integration of petrophysical data (e.g., data relating to physical rock properties and/or chemical rock properties, including data relating to how rock interacts with fluids), seismic data, and/or geological information is used in order to generate estimates of reservoir properties or to perform reservoir characterization. These estimates and reservoir characterizations are useful in seismic analysis and interpretation of a formation. Stochastic inversion provides one technique for the prediction of reservoir properties or for the performing of reservoir characterization, and improvements to existing stochastic inversion techniques may be desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Reservoir and/or formation characterization have advantageous uses for well planning, reserve estimation, reservoir model building, production history matching and prediction, and the like. As described in more detail below, one approach can attempt to perform reservoir and/or formation characterization by first receiving/collecting an amount of well data and then using this well data to generate one or more pseudo wells. Well data can correspond to records obtained by actually penetrating a subsurface region with one or more boreholes. As described in more detail below, after a limited amount of actual well data is collected/received from a limited area of the subsurface region, one or more embodiments can generate pseudo-wells based on this well data. Pseudo wells are generally understood as simulated wells which attempt to comprehensively reflect the properties of other areas of the subsurface region (where actual well data has not yet been collected from these other areas) based on the limited amount of well data that was actually collected/received from the limited area of the subsurface region. However, for reasons described in more detail below, the generated pseudo wells do not necessarily provide an accurate reflection of the comprehensive properties of the subsurface region. As such, in an attempt to determine whether or not the generated pseudo wells provide an accurate reflection of the comprehensive properties, one conventional approach for performing reservoir characterization can separately collect/receive seismic data relating to the subsurface region, and can then compare this separately-collected seismic data against the results exhibited by the pseudo wells (where the pseudo wells were generated based solely on the well data). If the results exhibited by a pseudo well are determined to be consistent with the separately-collected seismic data, then the pseudo well is determined by the conventional methods to more likely be an accurate reflection of the properties of the subsurface region.

One or more embodiments of the present invention can use a method referred to as One Dimensional Stochastic Inversion (ODiSI) to match large numbers of pseudo wells to the actual seismic data. With ODiSI, one or more embodiments can match large numbers of stochastically simulated 1D stratigraphic profiles to actual seismic traces. ODiSI can provides 3D volumes of reservoir properties and their associated uncertainties (e.g., uncertainty volumes). As described in more detail below, a stochastic inversion method, of which ODiSI is an example, can include techniques which rely on a user-developed transition probability matrix (TPM) to generate realizations of the reservoir.

As described above, generated pseudo wells do not necessarily provide an accurate reflection of the comprehensive properties of the subsurface region that the pseudo wells attempt to represent. When using ODiSI techniques, one reason why pseudo wells can provide inaccurate results is because the pseudo wells are generated based on a transition probability matrix (TPM), where the TPMs can be prone to error. For example, a TPM may be selected/determined by a user, and user error can introduce errors into the TPM. As another example, the correct values of the TPM may be unknown. Thus, when pseudo wells are generated by using a TPM that contains errors, erroneous pseudo wells are generated, where these erroneous pseudo wells do not accurately reflect the properties of the corresponding subsurface region. Accordingly, errors in the selected TPM can impact the subsequent well planning, reserve estimation, reservoir model building, reservoir characterization, etc. across a formation or reservoir. Thus, it may be beneficial to implement techniques that overcome potential issues related to errors in user selection/development of the TPM. Furthermore, it should be noticed that even when using multi-dimensional stochastic inversion, the same problem exists. Thus, the methodology described herein additionally aids in the reducing of the subjectivity of the user-provided TPM at locations where no reliable lithology information is available. In the following sections, while ODiSI is provided as an example, it should be appreciated that similar techniques are applicable when using multi-dimensional stochastic inversion as well.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
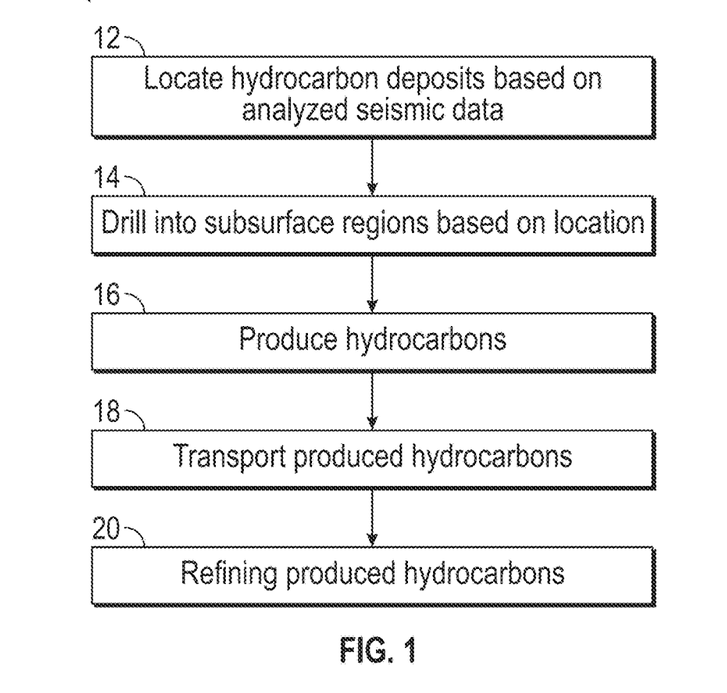
FIG. 1 illustrates a flow chart of various processes that may be performed based on analysis of seismic data acquired via a seismic survey system.
Figure 2:
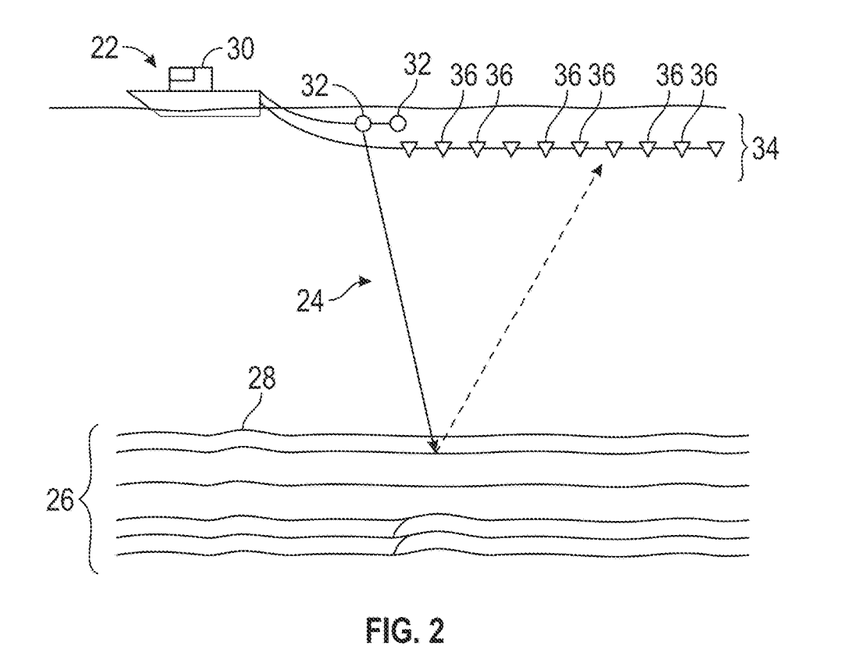
FIG. 2 illustrates a marine survey system in a marine environment.
Figure 3:
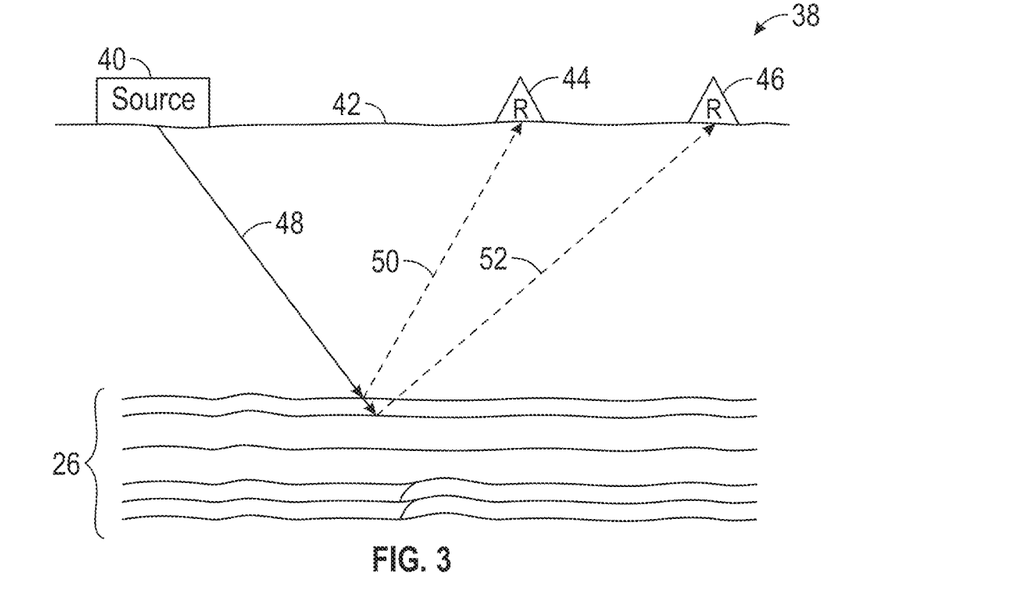
FIG. 3 illustrates a land survey system in a land environment.

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it should be noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired may be analyzed to generate a map or profile that illustrates various geological formations within the subsurface region. Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

With the foregoing in mind, FIG. 2 is a schematic diagram of a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, one or more seismic sources 32, a (seismic) streamer 34, one or more (seismic) receivers 36, and/or other equipment that may assist in acquiring seismic images representative of geological formations within a subsurface region 26 of the Earth. The vessel 30 may tow the seismic source(s) 32 (e.g., an air gun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic source(s) 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an air gun array) and one receiver 36 (represented in FIG. 2 as a set of hydrophones), it should be noted that the marine survey system 22 may include multiple seismic sources 32 and multiple receivers 36. In the same manner, although the above descriptions of the marine survey system 22 is described with one seismic streamer 34, it should be noted that the marine survey system 22 may include multiple streamers similar to streamer 34. In addition, additional vessels 30 may include additional seismic source(s) 32, streamer(s) 34, and the like to perform the operations of the marine survey system 22.

FIG. 3 is a block diagram of a land survey system 38 (e.g., for use in conjunction with block 12 of FIG. 1) that may be employed to obtain information regarding the subsurface region 26 of the Earth in a non-marine environment. The land survey system 38 may include a land-based seismic source 40 and land-based receiver 44. In some embodiments, the land survey system 38 may include multiple land-based seismic sources 40 and one or more land-based receivers 44 and 46. Indeed, for discussion purposes, the land survey system 38 includes a land-based seismic source 40 and two land-based receivers 44 and 46. The land-based seismic source 40 (e.g., seismic vibrator) that may be disposed on a surface 42 of the Earth above the subsurface region 26 of interest. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations and acquired or recorded by one or more land-based receivers (e.g., 44 and 46).

In some embodiments, the land-based receivers 44 and 46 may be dispersed across the surface 42 of the Earth to form a grid-like pattern. As such, each land-based receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a reflected seismic waveform 50 and the second receiver 46 may receive a reflected seismic waveform 52.

Figure 4:
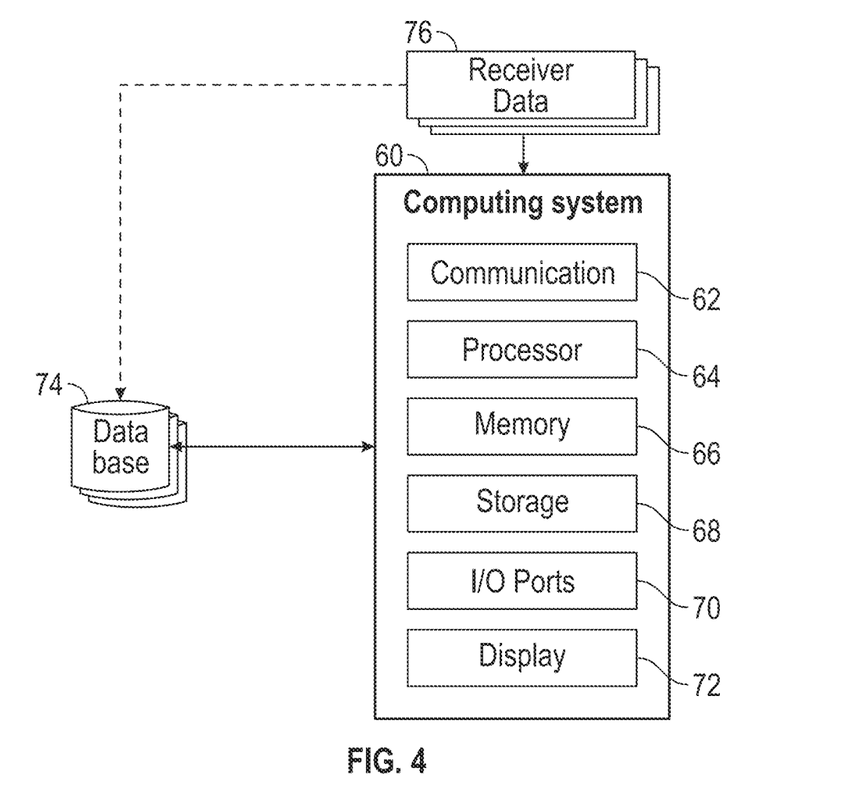
FIG. 4 illustrates a computing system that may perform operations described herein based on data acquired via the marine survey system of FIG. 2 and/or the land survey system of FIG. 3.

Regardless of how the seismic data is acquired, a computing system (e.g., for use in conjunction with block 12 of FIG. 1) may analyze the seismic waveforms acquired by the receivers 36, 44, 46 to determine seismic information regarding the geological structure, the location and property of hydrocarbon deposits, and the like within the subsurface region 26. FIG. 4 is a block diagram of an example of such a computing system 60 that may perform various data analysis operations to analyze the seismic data acquired by the receivers 36, 44, 46 to determine the structure and/or predict seismic properties of the geological formations within the subsurface region 26.

Referring now to FIG. 4, the computing system 60 may include a communication component 62, a processor 64, memory 66, storage 68, input/output (I/O) ports 70, and a display 72. In some embodiments, the computing system 60 may omit one or more of the display 72, the communication component 62, and/or the input/output (I/O) ports 70. The communication component 62 may be a wireless or wired communication component that may facilitate communication between the receivers 36, 44, 46, one or more databases 74, other computing devices, and/or other communication capable devices. In one embodiment, the computing system 60 may receive receiver data 76 (e.g., seismic data, seismograms, etc.) via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, predictions of seismic properties associated with one or more wells in the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems 60. In this case, each computing system 60 operating as part of a super computer may not include each component listed as part of the computing system 60. For example, each computing system 60 may not include the display 72 since multiple displays 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the seismic sources 32 or 40, the receivers 36, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 60 analyzes the acquired seismic data, the results of the seismic data analysis may be used to perform various operations within the hydrocarbon exploration and production industries. For instance, as described above, the acquired seismic data may be used to perform method 10 of FIG. 1 that details various processes that may be undertaken based on the analysis of the acquired seismic data.

In some embodiments, the results of the seismic data analysis may be generated in conjunction with a seismic processing scheme that includes seismic data collection, editing of the seismic data, initial processing of the seismic data, signal processing, conditioning, imaging (which may, for example, include production of imaged sections or volumes) prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result, a location of hydrocarbons within a subsurface region 26 may be identified. Additionally, it may be desirable to estimate reservoir or formation properties of a subsurface region 26. Techniques for reservoir characterization may utilize stochastic inversion, which will be described in greater detail below.

Figure 5:
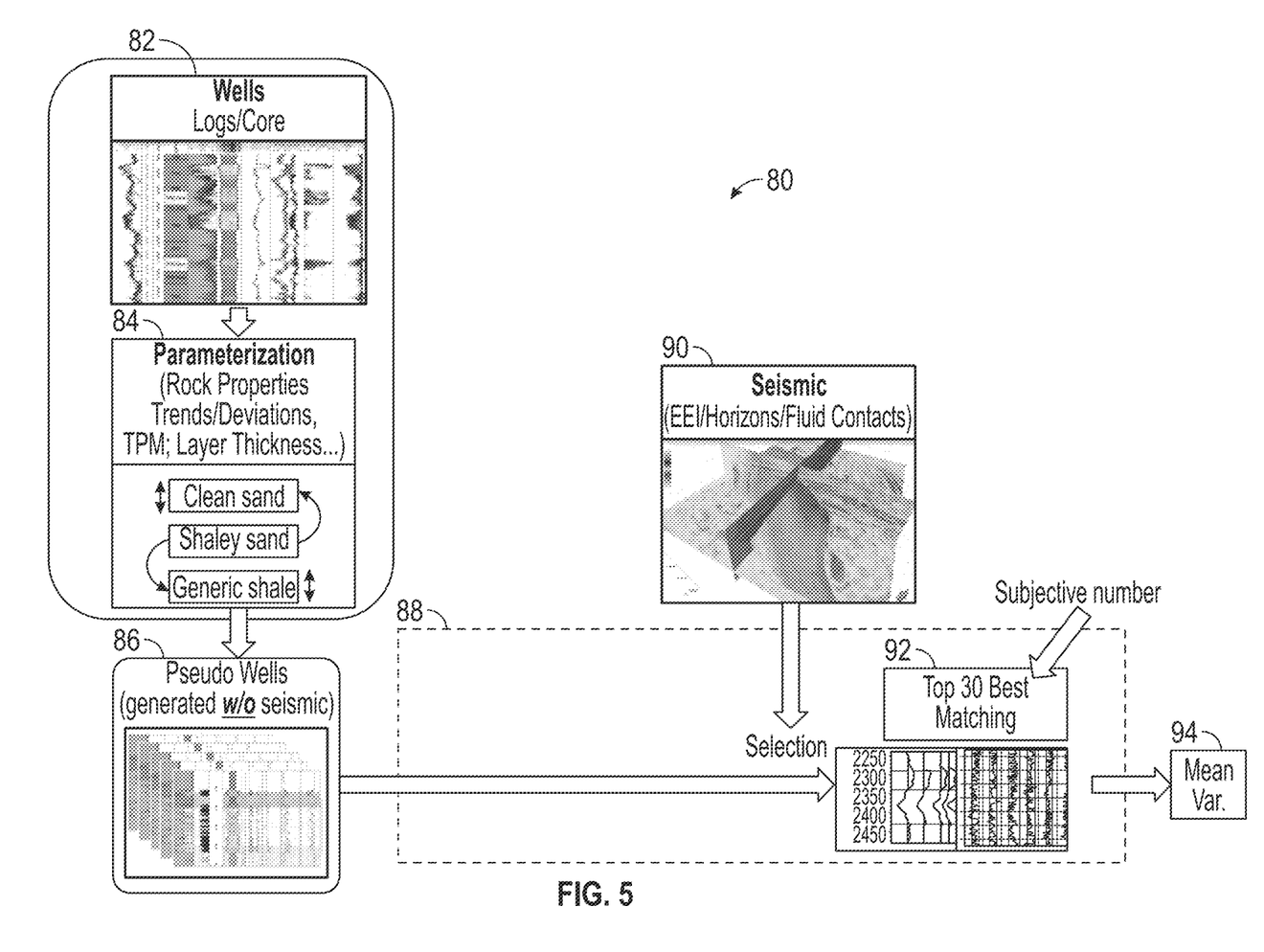
FIG. 5 illustrates a flow chart of a method that implements a first ODiSI technique.

The identification of the lithology (i.e., the identification of lithofacies, where "lithofacies" can generally be understood as bodies or layers of substances or rock formations with specified characteristics) of a subsurface region 26 of the Earth is useful in reservoir characterization. Identification of the lithology of the subsurface region 26 is useful in reservoir characterization because physical and chemical properties of the subsurface region 26 (that holds hydrocarbons and/or water) affect responses of tools utilized to determine reservoir properties. For example, calculations of porosity, water saturation ($S_w$), and permeability rely on the lithology of the reservoir. As described above, one or more embodiments can use One-Dimensional Stochastic Inversion (ODiSI) to determine an estimate of reservoir properties and associated uncertainties. As described above, ODiSI provides 3D volumes of reservoir properties and their associated uncertainties (e.g., uncertainty volumes), and ODiSI operates by matching large numbers of stochastically simulated 1D stratigraphic profiles (pseudo-wells) to actual seismic traces. FIG. 5 illustrates flow chart of a method 80 that implements ODiSI, for example, as being performed by the computing system 60, although it should be understood that the method 80 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64, for example, executing code, instructions, commands, or the like stored in the memory 66 (e.g., a tangible, non-transitory, computer-readable medium).

In step 82 and 84, well data is received and analyzed. This well data may correspond to data from one or more wells. Specifically, well data can correspond to data obtained by actually penetrating the subsurface region with one or more boreholes. The well data may also, for example, be a log, such as a well log. The parameters obtained from steps 82 and 84 can be applied across the whole survey area trace by trace, location by location (steps 86, 90, 92 and 94).

In step 84, the method 80 performs parameterization of the well data. ODiSI can be implemented when at least some well data of step 82 related to a reservoir (e.g., rock properties, depth trends/deviations, vertical statistics, bed thicknesses, etc.) is known. At step 84, the ODiSI can perform parameterization by performing a process on the well data in order to determine specific values/parameters that are then used in generating the pseudo wells in step 86. In the example of FIG. 5, the pseudo wells that are generated in step 86 are not generated based on any seismic data (resulting from seismic collection and/or imaging techniques). Instead, computing system 60 generates the pseudo wells based on the parameters of step 84 (where such parameters can include, for example, a determined TPM). Each generated pseudo well can include, for example, a full set of petrophysical curves, similar to a set of curves that can be obtainable from a seismically imaged or a logged well. The pseudo wells may be generated based on the actual well data (i.e., the parameterized data of step 84). In some embodiments, approximately 500, 1000, 2000, 3000, 4000, 5000, or more pseudo wells may be generated with respect to each trace (i.e., each location of the formation). Thus, for example, several thousand pseudo wells may be generated for a particular trace location, whereby each pseudo well is tailored to that location via the parameterized data of step 84.

The pseudo wells are generated in step 86. When generating each pseudo well, the method 80 can generate one or more macro-layers within each pseudo well. Each macro-layer can include lithology information, such as the proportion of facies for each macro-layer. Likewise, each macro-layer may include many micro-layers (or depth samples), each of which includes individual lithofacies. As described above, each pseudo well can be generated based on one or more TPMs, based on the number of macro-layers. Specifically, the generated distribution of lithofacies can be controlled by transition probabilities (i.e., where, given a particular lithofacies at a current depth sample (or micro-layer), the probability of lithologies at the next depth sample (or micro-layer) is determined) of the TPM. Distribution of the micro-layers can also be controlled by bed thickness distributions (i.e., thicknesses of the present lithology). As such, the transition probabilities can be expressed as a transition probability matrix (TPM) which determines the probability of which lithofacies will be next based on the lithology at the current depth sample (or micro-layer). As described in more detail below, the TPM can be provided as an input into the system of one or more embodiments, in order to generate the above-described pseudo wells. However, as described above, the TPM can contain errors which generate erroneous pseudo wells.

The pseudo well generation in step 86 can include performing separate lithofacies modeling based on, for example, a rock physics model that utilizes well data from step 82. The pseudo well generation process in step 86 can also make use of any generic models. Lithofacies modelling generally refers to determining the possible lithographic layers and/or the fluid properties of a given pseudo well. When performing lithofacies modelling, each layer can be possibly categorized as being of: clean sand, shale, shaley sand (i.e., a mix of sand and shale), etc, where each category can also reference possible fluids that are contained within each layer (as needed). Each pseudo well can be generated as having a complete set of reservoir properties and elastic properties for an entire lithofacies column, and each pseudo well may include a complete set of reservoir properties and elastic property curves.

For each pseudo well generated in step 86, the method 80 can generate a set of synthetic seismic data (e.g., a synthetic seismogram). By generating synthetic seismic data based on each pseudo well, the method 80 can then compare/match each pseudo well against actual seismic data by comparing the synthetic seismic data (corresponding to the pseudo well) to the actual seismic data. The synthetic seismic data can include filtered Extended Elastic Impedance (EEI) curves. A matching and selection step 88, which can be one dimensional, operates to match the generated pseudo wells with actual seismic data 90, one trace/location at a time. In this manner, the method 80 can utilize actual seismic data 90 in order to determine/select the pseudo wells which are more likely to accurately reflect the actual properties of the corresponding subsurface region. This selection in step 88 may include determining which of the generated synthetic seismic data (where the generated synthetic seismic data corresponds to the generated pseudo wells) best matches the seismic data 90. A subjective number (e.g., a user defined number) of matches are selected in step 88 and are represented as a set 92 of the best matching pseudo wells (relative to the actual seismic data 90).

As previously noted, each pseudo well can be associated with a set of petrophysical curves. Thus, in step 94, a particular parameter (and, thus an associated curve) of interest may be selected by a user, and, in step 94, averaging of the curves corresponding to that property (i.e., corresponding to the best match synthetic seismic data) may be undertaken. For example, a user can select a curve of the shale velocity ($V_{sh}$) as being of interest. Accordingly, in step 94, selection of the corresponding curves of the $V_{sh}$ from the set 92 of the best matching pseudo wells may be undertaken and these values may be averaged to produce an estimate of the reservoir property (e.g., $V_{sh}$) at the location associated with the pseudo wells and the seismic data 90. This process may be repeated for each respective trace, which may yield two new volumes (e.g., a mean and a standard deviation of the net-to-gross of the reservoir property (e.g., $V_{sh}$). In this manner, step 94 operates to average pseudo well reservoir property values (e.g., $V_{sh}$) to provide: (1) an estimate of a mean of a property at a given location, and (2) an estimate of a standard deviation of the property at the given location (i.e., to provides mean and the variance of the estimate for each trace).

In this manner, method 80 establishes rock property relationships and vertical statistics of a reservoir from the existing well data of step 82, as parameterized in step 84. This data is used to generate pseudo-wells that include a range of consistent and realistic reservoir properties. Synthetic seismic data, derived from the pseudo wells using, for example, EEI, are compared with actual seismic data 90 that has been actually received (e.g., compared with traces of input color-inverted angle stacks). The best matches are selected and, subsequently averaged to provide an estimate of selected reservoir properties (as well as, for example, their associated uncertainties, such as uncertainty volumes).

Figure 6:
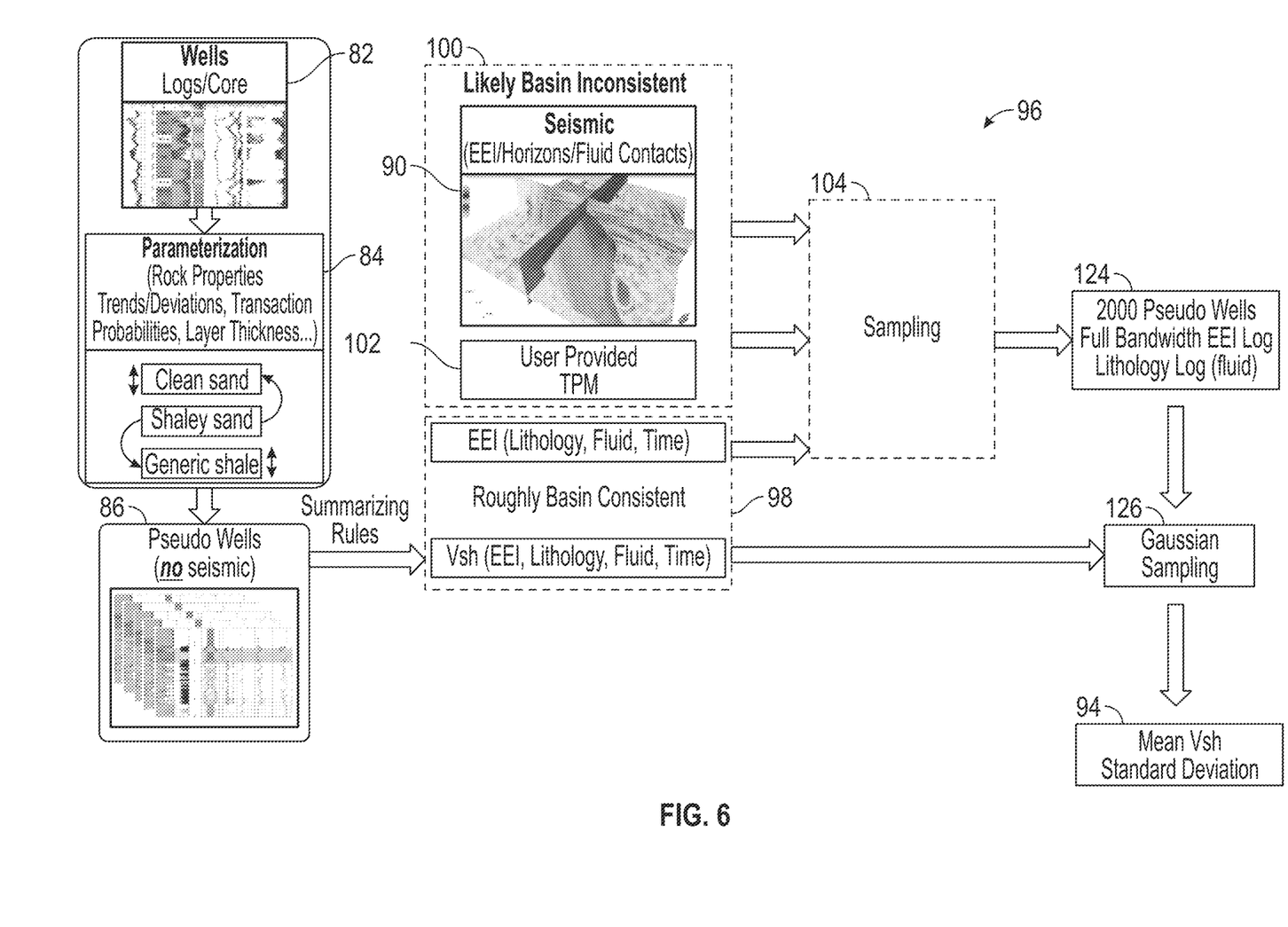
FIG. 6 illustrates a flow chart of a method of an embodiment that implements a second ODiSI technique.

FIG. 6 illustrates a flowchart of a method 96 of an embodiment that implements a modified version of the ODiSI technique described above with respect to FIG. 5. For example, the method 96 may implement a Bayesian ODiSI, for example, as being performed by the computing system 60, although it should be understood that the method 96 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64, for example, executing code, instructions, commands, or the like stored in the memory 66 (e.g., a tangible, non-transitory, computer-readable medium).

Method 96 (of FIG. 6) is advantageous over method 80 (of FIG. 5) because method 96 can generally generate pseudo wells that more accurately match the seismic data of the corresponding subsurface region. Specifically, method 80 compares the pseudo wells generated in step 86 against the seismic data 90, in order to determine/select which pseudo wells (from among the pseudo wells generated in step 86) more closely reflect the seismic data 90. However, even in the event that none of the generated pseudo wells of method 80 are good matches to the seismic data 90, method 80 will still use those pseudo wells which are better in comparison to perform reservoir characterization, and thus method 80 can choose pseudo wells that do not reflect the actual properties of the corresponding subsurface region. In contrast to method 80, method 96 generates pseudo wells (in step 124) by inputting actual seismic data into the pseudo-well generation process and, accordingly, method 96 generates pseudo wells that match the actual seismic data, and thus method 96 may generate pseudo wells that more likely reflect the properties of the corresponding subsurface region. In this manner, the outputs of step 94 of method 96 are improved, and the outputs provide for improved well planning, reserve estimation, reservoir model building, reservoir characterization, etc. across a formation or reservoir relative to the outputs of the method 80.

Steps 82, 84, and 86 (of FIG. 6) mirror steps 82, 84, and 86 of FIG. 5 and are undertaken in method 96 to generate pseudo wells based on the well data of step 82. In step 98, the pseudo wells are summarized via one or more predetermined rules. The rules define how EEI can change with respect to lithofacies and time, and the rules can define how Vsh can change with respect to lithofacies and time. In some embodiments, in step 98, a particular parameter (and, thus associated curve) of interest may be selected. For example, a curve of $V_{sh}$ may be selected as being of interest in step 98.

Additionally, input values may be received and subsequently transmitted in step 100. These input values may include, for example, actual seismic data 90. Likewise, the input values may include, for example, a TPM 102, which may be user defined. As previously discussed, the TPM 102 can be a matrix that defines for a given lithology at a current depth sample (or micro-layer), the probability of particular lithologies at a next depth sample (or micro-layer). For example, if a given lithology at a current depth sample is sand, the TPM 102 will provide the probabilities that the lithology at a next depth sample will be sand, shale, and/or shaley sand. Using the TPM 102, the overall proportion of sand, shale, and shaley sand may be determined for a given location of the reservoir.

In step 104, a sampling technique may be undertaken. The sampling technique, which may include Gibbs sampling or another type of sampling, operates, in step 104, to generate pseudo wells based at least in part on the actual seismic data 90 and the inputted TPM 102.

The sampling technique 104 may, for example, be performed by the computing system 60, although it should be understood that technique 104 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64. For example, processor 64 can execute code, instructions, commands, or the like stored in the memory 66 (e.g., a tangible, non-transitory, computer-readable medium).

The sampling technique may be applied to effectively handle the stochastic inversion of step 104 in which large numbers of pseudo wells are able to be generated (based upon depth samples of the seismic data 90). In step 124, iteratively generated full bandwidth EEI values and full bandwidth lithofacies can be transmitted from the sampling technique and the iteratively generated full bandwidth EEI values and the full bandwidth lithofacies can correspond to (are associated with) the pseudo wells generated by the sampling technique in step 104 utilizing the seismic data 90, as described above (and in contrast to the pseudo wells of step 86). These pseudo wells of step 124 are sampled, e.g., via Gaussian sampling techniques, in step 126 in view of the petrophysical property of interest from step 98 (e.g., $V_{sh}$).

One or more embodiments, in step 94, perform averaging of the curves corresponding to the particular parameter (and, thus associated curve) of interest. For example, in step 94, a selection of corresponding curves of the $V_{sh}$ from step 126 may be averaged to produce an estimate of the reservoir property (e.g., $V_{sh}$) at the location associated with the pseudo wells of step 124 and the seismic data 90. This process may be repeated for each respective trace, which may yield two new volumes (e.g., a mean and a standard deviation of the net-to-gross of the reservoir property (e.g., $V_{sh}$). In this manner, step 94 operates to average pseudo well reservoir property values (e.g., $V_{sh}$) to provide mean and standard deviation of the property estimates at a given location (i.e., to provide mean and the variance of the estimate for each trace).

In this manner, method 96 establishes rock property relationships and vertical statistics of a reservoir from the existing well data of step 82 (as parameterized in step 84), user provided TPM 102 and seismic data 90.

As previously discussed, selection of the TPM 102 may be made by a user. In some embodiments, selection of the TPM 102 may be based on, for example, data and/or information from an existing well (e.g., well data of step 82). However, this TPM 102 may be biased, for example, if the data of step 82 is an outlier relative to other portions of the reservoir. Indeed, while sophisticated (i.e., highly skilled) users may select the TPM 102, errors in the selection of the TPM 102 can occur. Furthermore, as the TPM 102 factors into the calculation of pseudo wells associated with step 124, errors in the TPM 102 can have large impacts on the reliability of the pseudo wells associated with step 124 and, accordingly, as well as the subsequent well planning, reserve estimation, reservoir model building, reservoir characterization, etc. across a formation or reservoir. Thus, it may be beneficial to implement a technique that overcomes potential issues related to errors in user selection of the TPM 102.

Therefore, one or more embodiments of the present invention can provide an appropriate TPM 102. For example, when an appropriate TPM 102 is provided as an input to step 104, the generated pseudo wells of step 124 should have a TPM that is similar to the TPM 102 that was input into step 104 (i.e., the TPM associated with the pseudo wells of step 124 and the TPM 102 should be similar). With one or more embodiments, a TPM can be consistent with another TPM by being numerically similar.

One potential technique to reduce potential errors in user selection of the TPM 102 would be to implement trial and error techniques. For example, a set of potential TPMs 102 to be used in conjunction with step 104 may be generated, the Bayesian ODiSI method 96 may be undertaken, and a TPM associated with the generated pseudo wells of step 124 may be checked against the TPM 102. This process can be repeated for additional TPMs 102 until a TPM 102 that is self-consistent is found. However, this technique may be time intensive.

Another technique may be an iterative approach in which an input TPM 102 is selected and utilized, a TPM associated with the pseudo wells is generated, the TPM associated with the pseudo wells of step 124 replaces the initially applied TPM 102 as a new input value to step 104, and the process may iteratively run until the TPM associated with the pseudo wells of step 124 stabilizes. This technique is described below in conjunction with FIG. 7.

Figure 7:
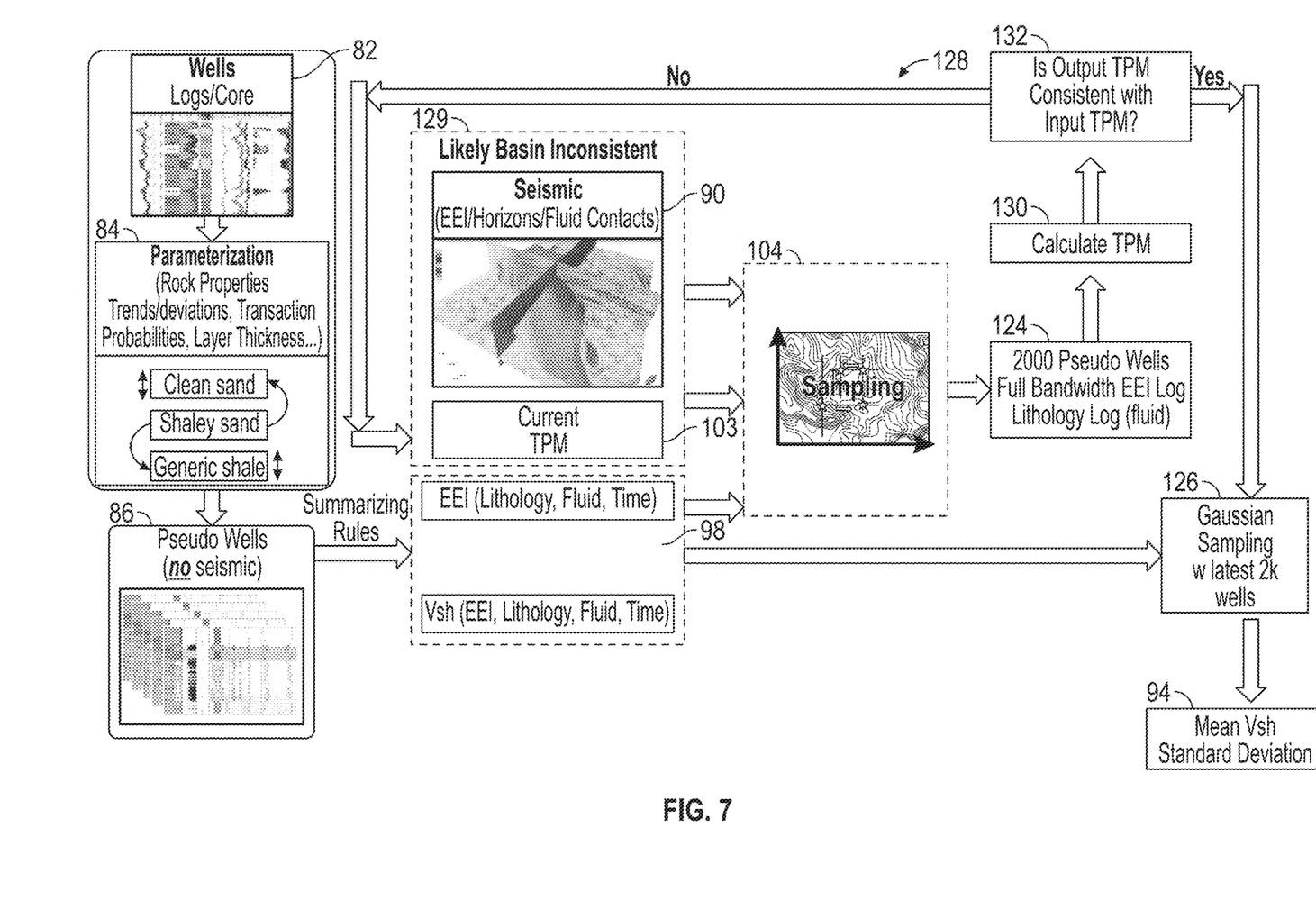
FIG. 7 illustrates a flow chart of a method of an embodiment that implements a third ODiSI technique.

FIG. 7 illustrates a flowchart of an embodiment of a method 128 that implements a modified version of the ODiSI technique described above with respect to FIG. 6. For example, the method 128 may implement an Iterative Bayesian ODiSI, for example, as being performed by the computing system 60, although it should be understood that the method 128 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64. Processor 64 can execute operations by executing code, instructions, commands, or the like stored in the memory 66 (e.g., a tangible, non-transitory, computer-readable medium).

Steps 82, 84, and 86 of FIG. 7 mirror steps 82, 84, and 86 of FIGS. 5 and 6 and are undertaken in method 128 to generate pseudo wells. In step 98, the pseudo wells are summarized via one or more predetermined rules that are applied in view of an estimate of a consistent basin of the reservoir. The summarizing rules may be applied to the pseudo wells to generate, for example, EEI curves and/or logs for each of the pseudo wells. Likewise, the summarizing rules may be applied to the pseudo wells to generate, for example, a particular parameter from the set of petrophysical curves. Thus, in some embodiments, in step 98, a particular parameter (and, thus associated curve) of interest may be selected. For example, a curve of $V_{sh}$ may be selected as being of interest in step 98.

Additionally, input values may be received and subsequently transmitted in step 129 (which differs from step 100 in the manner described in greater detail below). These input values may include, for example, the seismic data 90. Likewise, the input values may include, for example, a TPM 103. TPM 103 may (initially) be user defined, randomly generated and populated by the computing system 60 (e.g., by the processor 64 or by the processor 64 executing code stored, for example, in memory 66), and/or deterministically generated and populated by the computing system 60 (e.g., by the processor 64 or by the processor 64 executing code stored, for example, in memory 66). In step 104, a sampling technique may be undertaken to generate an output of pseudo wells based at least in part on the seismic data 90 and the TPM 103.

In step 124 of FIG. 7, iteratively generated full bandwidth EEI values and full bandwidth lithofacies are transmitted from the sampling technique 104. The iteratively generated full bandwidth EEI values and the full bandwidth lithofacies correspond to (are associated with) the pseudo wells generated by the sampling technique in step 104. The pseudo wells are generated by utilizing the seismic data 90, as described above (and in contrast to the generating of pseudo wells of step 86, which does not utilize any seismic data in the generating process). As illustrated in the example of FIG. 7, there are 2000 pseudo wells in step 124, however, fewer or more than 2000 pseudo wells may be generated. Next, in step 130, a TPM (e.g., an output TPM) is calculated from the pseudo wells. Subsequently, in step 132, the output TPM is compared against the TPM 103 (the initial, for example, user defined TPM 103, as this TPM 103 is the first iteration).

If the output TPM is consistent with (numerically similar to) the TPM 103, then the TPM 103 has been validated and the method 128 may proceed to steps 126 and 94 (described above with respect to FIG. 6). However, if the output TPM is not consistent with (numerically similar to) the TPM 103, then the TPM 103 has not been validated (i.e., the TPM 103 is not self consistent). In this situation, the method 128 may proceed to step 129, in which the initial (e.g., user provided) TPM 103 is updated with the output TPM. Thus, the output TPM now acts as TPM 103. Steps 104 and 124 are undertaken with the TPM 103 having the output TPM value. At step 130, another TPM (e.g., a second output TPM) is calculated from the pseudo wells. Subsequently, in step 132, the second output TPM is compared against the TPM 103 (having the [first] output TPM value). If the second output TPM is consistent with the TPM 103 (having the [first] output TPM value), then the TPM 103 has been validated and the method 128 may proceed to steps 126 and 94. However, if the second output TPM is not consistent with the TPM 103 (having the [first] output TPM value), then the TPM 103 (having the [first] output TPM value) has not been validated (i.e., the TPM 103 is not self consistent). In this situation, the method 128 may proceed to step 129, in which the TPM 103 having the [first] output TPM value is updated with the value of the second output TPM as the TPM 103 and the process described above is undertaken again to further stabilize the TPM 103.

In some embodiments, the determination in step 132 is determined by using a difference threshold (i.e., a threshold value) to compare TPM 103 against the TPM that is calculated from the pseudo wells. For example, if the TPM 103 and the TPM calculated from the pseudo wells have a difference in value less than or less than or equal to a threshold value (i.e., a fixed value, a percentage, or the like), then the TPM calculated from the pseudo wells is deemed to be consistent with the TPM 103 in step 132. In some embodiments, the iterative process described above may continue until the TPM 103 and the TPM calculated from the pseudo wells have a difference in value less than or less than or equal to a threshold amount.

Additionally and/or alternatively, a fixed number of iterations may be set to a predetermined number and the TPM calculated from the pseudo wells may be utilized when that number of iterations is reached (if the TPM 103 and the TPM calculated from the pseudo wells do not yet have a difference in value less than or less than or equal to a threshold amount). For example, $n^{th}$ pseudo wells (i.e., an $n^{th}$ iteration, whereby "n" is an integer value greater than 1 that represents the number of iterations reached) may be generated utilizing an $n^{th}$ TPM 103 and the seismic data 90 and the $n^{th}$ pseudo wells may be utilized to characterize the reservoir in the subsurface region 26 of Earth when an $n^{th}+1$ TPM (the TPM calculated from the pseudo wells) is determined not to be consistent with the $n^{th}$ TPM 103 (does not yet have a difference in value less than or less than or equal to a threshold amount) when a fixed number of TPM iterations is equivalent to n (i.e., the fixed number of iterations is reached).

In other embodiments, the iterative process described above may be halted via a command or other interrupt signal and the TPM calculated from the pseudo wells may be utilized when the command or other interrupt signal is received.

The method 128 allows for each trace to have its own TPM 103. Moreover, by allowing the iterative process to adjust the TPM 103, there are fewer potential effects (i.e., less subjectivity) due to the initial selection of a TPM 103, relative to method 96. In this manner, the computing system 60 that may perform various data analysis operations with increases to the reliability of the results with respect to, for example, well planning, reserve estimation, reservoir model building, and/or reservoir characterization by providing a more reliable TPM 103 at locations across the reservoir. ODiSI products can be input to our seismic analysis and interpretation workflow.

The specific embodiments described above have been shown by way of example, and it should be understood that these embodiments may be susceptible to various modifications and alternative forms. It should be further under-

What is claimed is:

1. A method, comprising:
   receiving a first transition probability matrix (TPM) of a subsurface region, wherein the first TPM defines, for a given lithology at a current depth sample, a probability of particular lithologies at a next depth sample;
   receiving seismic data for the subsurface region;
   utilizing the first TPM and the seismic data to generate first pseudo wells;
   calculating a second TPM from the first pseudo wells;
   determining whether the second TPM is consistent with the first TPM; and
   utilizing the first pseudo wells to characterize a reservoir in the subsurface region when the second TPM is determined to be consistent with the first TPM.

2. The method of claim 1, comprising replacing the first TPM with the second TPM when the second TPM is determined not to be consistent with the first TPM.

3. The method of claim 2, comprising:
   utilizing the second TPM and the seismic data to generate second pseudo wells;
   calculating a third TPM from the second pseudo wells; and
   determining whether the third TPM is consistent with the second TPM.

4. The method of claim 3, comprising utilizing the second pseudo wells to characterize the reservoir in the subsurface region when the third TPM is determined to be consistent with the second TPM.

5. The method of claim 3, comprising replacing the second TPM with the third TPM when the third TPM is determined not to be consistent with the second TPM.

6. The method of claim 1, wherein determining whether the second TPM is consistent with the first TPM comprises determining whether a difference in value between the second TPM and the first TPM is less than a threshold amount or is less than or equal to the threshold amount.

7. The method of claim 1, comprising:
   generating $n^{th}$ pseudo wells utilizing an $n^{th}$ TPM and the seismic data; and
   utilizing the $n^{th}$ pseudo wells to characterize the reservoir in the subsurface region when an $n^{th}+1$ TPM is determined not to be consistent with the $n^{th}$ TPM and when fixed number of TPM iterations is equivalent to n.

8. The method of claim 1, comprising:
   generating $n^{th}$ pseudo wells utilizing an $n^{th}$ TPM and the seismic data;
   receiving an interrupt signal; and
   utilizing the $n^{th}$ pseudo wells to characterize the reservoir in the subsurface region when the interrupt signal is received.

9. The method of claim 1, comprising operating a stochastic sampling algorithm to utilize the first TPM and the seismic data to generate the first pseudo wells.

10. A tangible, non-transitory, machine-readable media, comprising instructions configured to cause a processor to:
    generate first pseudo wells based at least in part on a first transition probability matrix (TPM) and seismic data of a subsurface region, wherein the first TPM comprises probabilities of particular lithologies at specified depth samples based upon a given lithology at a current depth sample;
    calculate a second TPM based upon the first pseudo wells;
    determine whether a difference between the second TPM and the first TPM is less than a threshold value or is less than or equal to the threshold value; and
    utilize the first pseudo wells to characterize a reservoir in the subsurface region when the difference between the second TPM and the first TPM is less than the threshold value or is less than or equal to the threshold value.

11. The tangible, non-transitory, machine-readable media of claim 10, comprising instructions configured to cause the processor to replace the first TPM with the second TPM when the difference between the second TPM and the first TPM is greater than the threshold value.

12. The tangible, non-transitory, machine-readable media of claim 10, comprising instructions configured to cause the processor to:
    generate second pseudo wells based at least in part on the second TPM and the seismic data,
    calculate a third TPM based upon the second pseudo wells; and
    determine whether a difference between the third TPM and the second TPM is less than the threshold value or is less than or equal to the threshold value.

13. The tangible, non-transitory, machine-readable media of claim 12, comprising instructions configured to cause the processor to characterize the reservoir in the subsurface region based upon the second pseudo wells when the difference between the third TPM and the second TPM determined to be less than the threshold value or less than or equal to the threshold value.

14. The tangible, non-transitory, machine-readable media of claim 10, comprising instructions configured to cause the processor to:
    generate $n^{th}$ pseudo wells utilizing an $n^{th}$ TPM and the seismic data; and
    utilize the $n^{th}$ pseudo wells to characterize the reservoir in the subsurface region when an $n^{th}+1$ TPM is determined not to be consistent with the $n^{th}$ TPM and when fixed number of TPM iterations is equivalent to n.

15. The tangible, non-transitory, machine-readable media of claim 10, comprising instructions configured to cause the processor to:
    generate $n^{th}$ pseudo wells utilizing an $n^{th}$ TPM and the seismic data; and
    utilize the $n^{th}$ pseudo wells to characterize the reservoir in the subsurface region upon generation of an interrupt signal by the processor or receipt of the interrupt signal.

16. The tangible, non-transitory, machine-readable media of claim 10, comprising instructions configured to cause the processor to utilize a stochastic sampling algorithm to generate the first pseudo wells based at least in part on the first TPM and the seismic data.

17. A device, comprising:
    a processor configured to:
    generate first pseudo wells based at least in part on a first transition probability matrix (TPM) and seismic data of a subsurface region, wherein the first TPM comprises probabilities of particular lithologies at specified depth samples based upon a given lithology at a current depth sample;

calculate a second TPM based upon the first pseudo wells;

determine whether a difference between the second TPM and the first TPM is less than a threshold value or is less than or equal to the threshold value; and utilize the first pseudo wells to characterize a reservoir in the subsurface region when the difference between the second TPM and the first TPM is less than the threshold value or is less than or equal to the threshold value.

18. The device of claim 17, wherein the processor is configured to replace the first TPM with the second TPM when the difference between the second TPM and the first TPM is greater than the threshold value.

19. The device of claim 17, wherein the processor is configured to:

generate second pseudo wells based at least in part on the second TPM and the seismic data, calculate a third TPM based upon the second pseudo wells;

determine whether a difference between the third TPM and the second TPM is less than the threshold value or is less than or equal to the threshold value; and characterize the reservoir in the subsurface region based upon the second pseudo wells when the difference between the third TPM and the second TPM determined to be less than the threshold value or less than or equal to the threshold value.

20. The device of claim 17, wherein the processor is configured to:

generate $n^{th}$ pseudo wells utilizing an $n^{th}$ TPM and the seismic data; and utilize the $n^{th}$ pseudo wells to characterize the reservoir in the subsurface region when an $n^{th}+1$ TPM is determined not to be consistent with the $n^{th}$ TPM and when fixed number of TPM iterations is equivalent to n.

* * * * *